Nov. 26, 1968  P. J. KLEIN  3,412,854
APPARATUS FOR SEPARATION OF MAGNETIZABLE MATERIAL FROM
STOCK SUSPENSIONS
Filed March 21, 1966  2 Sheets-Sheet 1

Nov. 26, 1968   P. J. KLEIN   3,412,854
APPARATUS FOR SEPARATION OF MAGNETIZABLE MATERIAL FROM
STOCK SUSPENSIONS
Filed March 21, 1966   2 Sheets-Sheet 2

United States Patent Office 3,412,854
Patented Nov. 26, 1968

3,412,854
APPARATUS FOR SEPARATION OF MAGNETIZABLE MATERIAL FROM STOCK SUSPENSIONS
Paul J. Klein, Menasha, Wis., assignor to Kimberly-Clark Corporation, Neenah, Wis., a corporation of Delaware
Filed Mar. 21, 1966, Ser. No. 535,840
4 Claims. (Cl. 209—39)

ABSTRACT OF THE DISCLOSURE

Apparatus in the form of a magnetic trap suitable for the removal of magnetizable material from a flowing fluid suspension of a stock which is susceptible to air entrainment. The structural arrangement provides a circuitous flow between inlet and outlet in a magnetic field while confining the flow so that air bubble build-up and air entrainment in the trap is inhibited.

---

This invention relates to apparatus for separating magnetizable and foreign matter from suspensions of materials such as paper pulp stocks.

In the manufacture of paper, for example, the paper pulp stock may contain varying amounts of metallic foreign material depending upon the type of pulp used. Repulped waste paper may contain large quantities of paper clips, wires, etc. The provision of baled virgin pulp to a pulping operation may inadvertently result in some baling wire being introduced into the pulp stock. In addition to foreign materials of solid nature, pulp slurries tend to entrain air. Existing magnetic traps tend to allow the entrained air to form large air bubbles. Such air bubbles will move to the eye of a pump impeller, for example, causing air binding of the pump. Additionally, these air bubbles tend to inhibit flow of the pulp slurry itself.

A primary object of this invention is to provide means whereby suspensions which tend to entrain air (such as the paper pulp) may be subjected to an efficient metal removal operation in apparatus which occupies a small space, which can be cleaned with ease and which inhibits the formation of detrimental air bubbles.

The invention will be more fully understood by reference to the following detailed description and accompanying drawings wherein:

FIG. 1 schematically illustrates a common form of equipment arrangement in a papermaking process;

Figure 1:
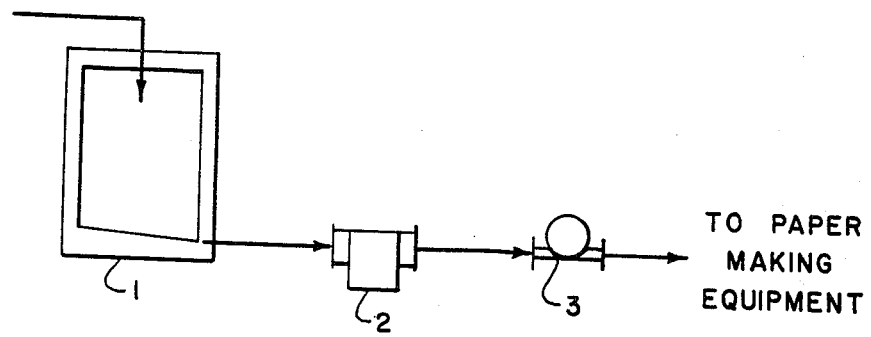

Referring to the drawings, the numeral 1 in FIG. 1 designates a conventional papermaking equipment stock chest. Stock is commonly delivered from the chest under gravity to a magnetic trap 2. From the trap 2 the stock or pulp suspension is delivered to a pump 3 from which it is directed to papermaking equipment as indicated by the arrow in FIG. 1.

The usual trap 2, particularly those in which the stock suspension is subjected to a whirling action, has been found to result in reasonable separation of magnetic materials but the configuration of such traps also has resulted in a tendency to develop large air bubbles. Such air bubbles inhibit stock flow through the trap itself and also tend to cause air binding of the pump 3.

Figure 2:
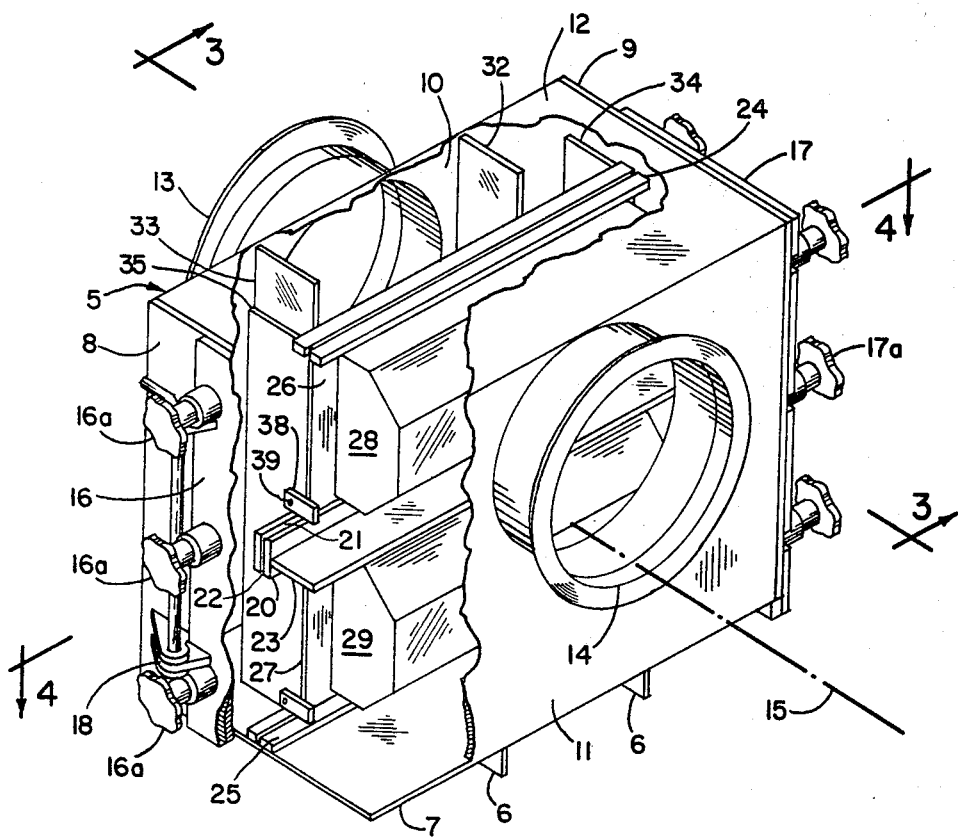
FIG. 2 is an isometric view with parts broken away illustrating the apparatus of this invention.
Figure 3:
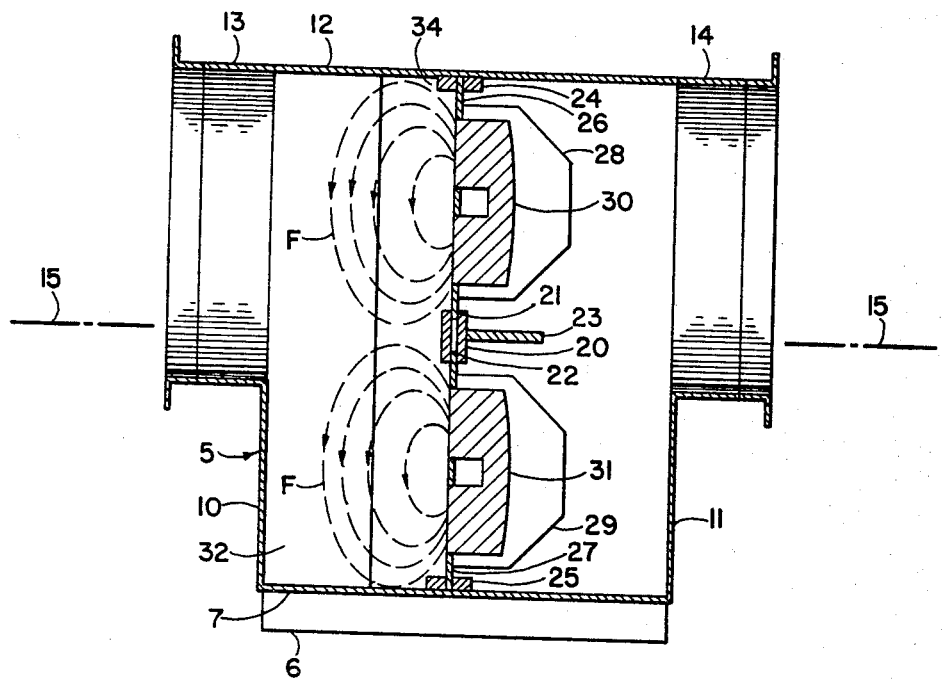
FIG. 3 is a view taken along line 3—3 of FIG. 2.
Figure 4:
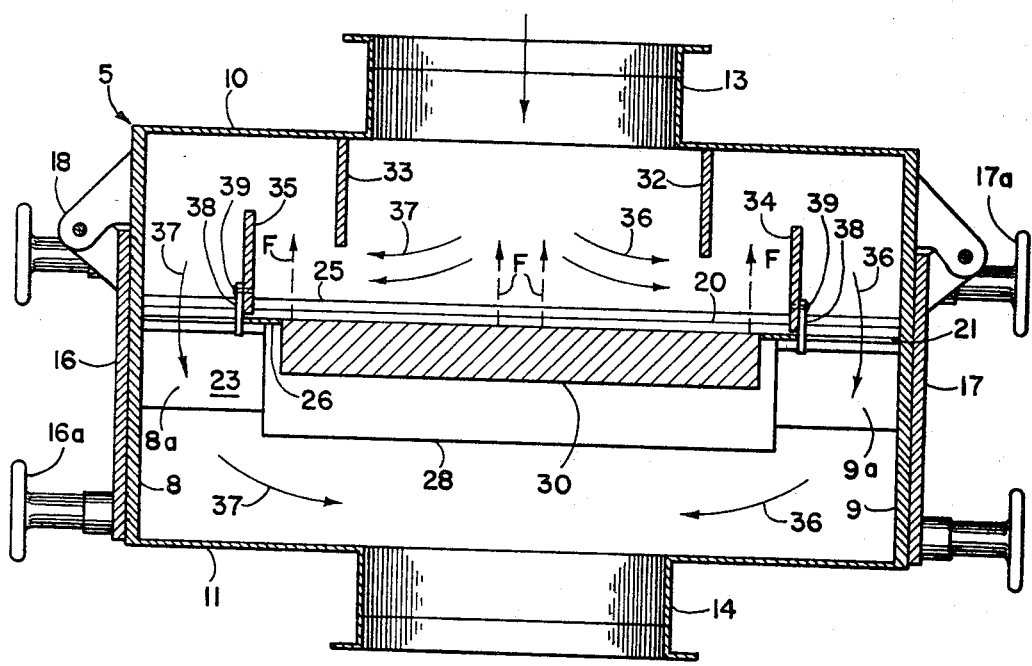
FIG. 4 is a view taken along line 4—4 of FIG. 2.

The apparatus of the present invention is illustrated in FIGS. 2–4 inclusive. Therein the numeral 5 designates a housing which is rectangular in cross-section and, together with its component parts, is suitably constructed generally of stainless steel. This is for the purpose of maintaining adequate cleanliness and inhibiting corrosion.

The housing 5 is preferably of relatively short length to reduce the distance from the chest to the pump. A functional feature of the trap is the nature of the flow path therethrough, as will become evident hereinafter.

As will be seen from the drawings, the housing is supported suitably on spaced skids 6, the skids being secured to the bottom wall 7 of the housing. The housing further includes opposed parallel side walls 8, 9, front wall 10, rear wall 11, and top horizontally extending wall 12. The front wall 10 has an inlet port 13 and in axial alignment with port 13 there is provided an outlet port 14 in wall 11. The inlet and outlet ports or openings are offset vertically of and are spaced above the horizontally extending center line 15 passing through the device (FIG. 3). Also, the inlet and outlet openings are disposed so that the inlet and outlet top surfaces are in line with and flush with the inner surface of top 12 of the housing. The wall 8 is provided with a cleanout door 16 which extends substantially the full height of the housing and is openable upon lossening of knobs 16a, the door 16 being hinged for pivotal movement at 18. Wall 9 is similarly provided with a cleanout door 17 having knobs 17a and it is not considered necessary to further specifically describe the same.

Barrier means are interposed between the inlet and outlet ports and extend from the inner top surface of wall 12 downwardly to the bottom wall 7 of the trap. Projecting across the full width of the apparatus between walls 8 and 9 and secured thereto is a horizontally extending central support 20 of the barrier means. This support is of relatively small cross-sectional dimension and may be formed in any suitable manner but is preferably provided to have therein upper and lower channels 21, 22 (FIG. 3). A horizontal brace 23 engages support 20. A channel 24 is welded or otherwise suitably secured to the interior of the top horizontally extending wall 12 above support 20 and a similar channel 25 is secured below support 20 to the bottom wall 7. These channels (FIG. 2) receive the peripheral flanges 26, 27 of box housings 28, 29 which are thereby slidably removable from the housing through the cleanout doors. The combination of the box housings 28, 29 and the support 20 is effective to form the barrier means and to seal off the major and central portion of the width of the apparatus from the flow of fluid through the apparatus. Box housings 28, 29 themselves terminate short of the walls 8, 9 (FIG. 4) and provide lateral fluid flow passage means 8a, 9a around the barrier means as will be noted more particularly hereunder.

Each of the box housings carries a heavy duty magnet of generally horseshoe shape. Such magnets are designated at 30, 31 (FIG. 3). These box housings, including the magnets, are commercially available. The box housing itself is of non-magnetic stainless steel and the magnetic pole pieces are usually of magnetic stainless steel.

Projecting inwardly of the housing 10 adjacent the inlet port 13 and extending the full height of the chamber from the top 12 to the bottom 7 is a pair of opposed baffles 32, 33. These baffles serve to limit the width of an inflowing suspension of material and to direct it toward the central barrier and magnets 30, 31. A second set of baffles 34, 35 extend vertically adjacent the central barrier means 20 in slightly spaced relation therefrom to provide a simple clearance for each box housing removal. These baffles 34, 35 project toward and are disposed somewhat laterally of baffles 32, 33. Baffles 34, 35 also extend from the top 12 to the bottom wall 7. All of the baffles are suitably secured to the top and bottom walls by any convenient means such as weldments (not shown) or the like. Baffles 32, 34 define with the housing wall 9 a fluid flow passage indicated by the arrows and numerals 36 (FIG. 4). A similar fluid flow passage 37 is defined by the baffles 33, 35 and the wall 8. These passages are continuous in a circuitous path from the front surface of the barrier means and around the barrier means to the lateral fluid flow passages and to the outlet at 14. Thus, a unidirectional flow to the passages 8a, 9a is avoided, and a relatively long path length in the magnetic field is provided. The passages are of sufficient dimension to accommodate the flow of the suspension at decreased velocity occasioned by stock impact with the barrier means.

In some installations only one lateral fluid flow passage is necessary. Such may serve the purpose where fluid velocity change at the front surface of the barrier means is relatively low. While the fluid flow systems in which the trap is usable may vary widely in their specific nature and physical dimensions, the lateral passage means should provide an open area to the fluid flow which is greater than that of either the inlet or the outlet opening. Characteristics such as slurry viscosity and consistency influence the velocity change at the barrier means and trap modification as to specific dimensions is warranted to achieve optimum operation. Accordingly, the extent to which the sum of the areas of the lateral passage means exceeds the area of the inlet and of the outlet is dependent upon specific operating conditions.

The baffles 32, 33 in their projection towards the magnets 30, 31 preferably overlap the baffles 34, 35 in their projection from the barrier means and magnets as shown in FIG. 4 in plan view. Such overlapping is not necessary but permits increased restriction of the flow path where such is desired. It is necessary to optimum operation that the inner extremities of the baffles 32, 33 lie within the flux patterns of the magnets, such being indicated at F. Otherwise expressed, the flux pattern of a magnet passes through the pulp suspension at all flow levels wholly across the circuitous path so that substantially complete removal of metal is assured.

The box housings 28, 29 are retained in position horizontally by bar latches 38 which are 4 in number, 2 being disposed in cooperation with and engaging a flange of each box housing. Each bar latch has a pivot connection with a baffle through the medium of a rivet 39 as shown most clearly in FIG. 2. The latches simply are pivoted manually from the position of FIG. 2 to permit adjustment of the box housings during assembly and to permit easy sliding removal of the box housings for cleaning and removal of trash in the channels when such is desired.

In operation, a slurry of papermaking fibers having a consistency of between about 3–5% may be flowed from the stock chest 1 to the pump 3 through the trap 2. Such a slurry of papermaking fibers is a relatively thick suspension. Also, such suspension may include tramp magnetizable materials such as iron particularly. The flow of stock is directed to the trap 2 so that the impingement of the stock is in a horizontal direction and in planes which lie parallel to a horizontal plane. The impingement of the stock on the barrier means including the magnets lying in a vertical plane causes a decrease in the velocity of the incoming stock and exposes the stock to the action of the fields of the magnets to permit withdrawal by magnetic action of the tramp iron, wire fragments and the like. Additionally, materials having greater specific gravity if present, such as stones or the like, may drop to the bottom of the housing 10 if the consistency is such that they can separate from the stock. The removal of material only on a specific gravity basis is not an intended function of the device, however, and in the case of paper pulp the slurries must be subjected to other cleaning operations. Such include screening and centrifuging to remove light and heavy materials. The removal of very heavy non-magnetic material is simply a bonus from operation of the device.

The flow of the suspension, however, is not subjected to excessive turbulence. This is for the reason that the suspension in its movement through the circuitous path is confined substantially wholly between the horizontal extending top 12 and the bottom 7. To achieve this purpose, the top surface is horizontal or planar to avoid pockets wherein air might be trapped and develop into large bubbles. Thus, material flowing in a horizontal plane within the housing tends to remain in that plane as it follows the circuitous passage from the zone of the magnets between the baffles 32, 34 and the baffles 34 and side walls to the outlet 14 and is, therefore, substantially free of detrimental air bubbles. It is considered very important that the horizontal nature of flow be maintained and that for this purpose the upper inner surface of top 12 lie in a horizontal plane substantially planar with the upper extremity of the inlet and outlet. Under these conditions entrained air carried in the stock as it enters the trap does not tend to develop into large bubbles, which would tend both to bind the pump 3 and to limit flow of stock suspension itself to and through the trap.

The inflow to the trap (FIG. 3) is primarily above the center line 15 and stock flowing in this area around the magnets to the outlet will have a substantially higher velocity than stock flowing adjacent the bottom 7 of the trap. Low velocity at the bottom of the trap minimizes the possibility that material falling to the bottom of the trap will be washed through. Thus the structure offers, in addition to its capacity for removing magnetizable materials, a settling tank feature.

While the invention has been particularly described in connection with paper pulp slurries, it is contemplated that it is effective where air entrainment in metal removal is a problem as in the treatment of clay suspensions, citrus fiber slurries and chemical processes.

It will be understood that this invention is susceptible to modification in order to adapt to different usages and conditions and, accordingly, it is desired to comprehend such modifications within the invention as may fall within the scope of the appended claims.

What is claimed is:

1. A trap for the removal of magnetizable materials from a flowing fluid suspension of stock which is susceptible to air entrainment, said trap being arranged to minimize the buildup of air bubbles, said trap comprising a housing having side wall means, a bottom wall, an inlet port and outlet port through the side wall means disposed in opposed relation and in substantially axial alignment, a top wall having an inner top surface of the trap extending in a horizontal plane over the length of the trap between and in planar alignment with the upper inner surfaces of the inlet and outlet ports, barrier means between the inlet and outlet ports extending from the said inner top surface of the housing downwardly to substantially the bottom of the trap for substantially preventing direct flow of suspension between the inlet and outlet ports, said barrier means having a forward surface including magnetic means fronting on the inlet port for impingement of the stock suspension thereon and said barrier means and the side wall means of the trap defining a vertical spacing in the form of lateral fluid flow passage means of greater area than said inlet port, and baffle means preventing unidirectional flow from the inlet port and the forward surface of the barrier means to the said lateral fluid flow passage means, said baffle means defining a circuitous fluid flow path from the front surface of the barrier means to said lateral passage means, and said magnetic means having a flux pattern which extends wholly across said circuitous path toward said inlet port.

2. A trap according to claim 1 and wherein the housing is rectangular and the barrier means define a spacing with each of the side walls of the trap thereby providing two lateral fluid flow passages the sum of whose areas is greater than that of the inlet port.

3. A trap according to claim 1 wherein the inlet and outlet ports in axial alignment have a substantially common axis well above the center line passing horizontally through the trap whereby a region of low velocity fluid flow is provided adjacent the bottom of the trap.

4. A trap according to claim 1 wherein the baffle means for preventing unidirectional flow from the inlet port to the lateral fluid flow passage means include: a baffle disposed adjacent the inlet port projecting inwardly toward said barrier means and having its inner extremity within the flux field of the magnetic means, a second baffle disposed adjacent the lateral fluid flow passage means projecting toward the first baffle and spaced laterally thereof toward the fluid flow passage means to define the fluid flow path, said baffle means each extending from the top wall to the bottom wall and said baffles overlapping in their projections toward each other.

References Cited

UNITED STATES PATENTS

| 446,704 | 2/1891 | Edwards | 209—223 X |
| 454,555 | 6/1891 | Atkins | 209—223 |
| 2,288,264 | 6/1942 | Byrd | 209—223 |
| 2,464,628 | 3/1949 | Willard | 209—232 |
| 2,699,871 | 1/1955 | Stem | 209—223 |
| 2,915,186 | 12/1959 | Johannesen | 210—223 |

FOREIGN PATENTS

| 753,790 | 8/1956 | Great Britain. |

HARRY B. THORNTON, *Primary Examiner.*

TIM R. MILES, *Assistant Examiner.*